United States Patent
Allman et al.

(10) Patent No.: US 7,483,062 B2
(45) Date of Patent: Jan. 27, 2009

(54) METHOD FOR REMOVAL OF MOVING OBJECTS FROM A VIDEO STREAM

(75) Inventors: Mark Allman, Southampton (GB); Scott John Clee, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 11/064,352

(22) Filed: Feb. 23, 2005

(65) Prior Publication Data
US 2005/0243192 A1   Nov. 3, 2005

(30) Foreign Application Priority Data
Apr. 28, 2004   (GB)   ................... 0409463.7

(51) Int. Cl.
*H04N 5/262*   (2006.01)
(52) U.S. Cl. ........................ 348/239; 382/254
(58) Field of Classification Search ................. 348/239
See application file for complete search history.

(56) References Cited

U.S. PATENT DOCUMENTS

| | | | |
|---|---|---|---|
| 5,914,748 A | 6/1999 | Parulski et al. | |
| 5,915,044 A | 6/1999 | Gardos et al. | |
| 6,026,181 A * | 2/2000 | Murakami | 382/168 |
| 6,078,619 A | 6/2000 | Monro et al. | |
| 6,301,382 B1 | 10/2001 | Smith et al. | |
| 6,681,058 B1 * | 1/2004 | Hanna et al. | 382/294 |
| 2001/0053248 A1* | 12/2001 | Maeda | 382/165 |

FOREIGN PATENT DOCUMENTS

WO   WO 01/16885   3/2001

OTHER PUBLICATIONS

Demonstration published at the website http://www.cs.huji.ac.il/labs/vision/demos/removal/removal1.html "The Vanishing Lady", printed from website Feb. 22, 2005.

* cited by examiner

*Primary Examiner*—Samir A Ahmed
*Assistant Examiner*—Sean Motsinger
(74) *Attorney, Agent, or Firm*—Patents on Demand, PA

(57) ABSTRACT

A method of removing a moving part from a video stream image comprising obtaining a plurality of frame-series images of the scene, each image comprising a moving part and a static part; comparing the plurality of frame-series images to identify parts of the scene that are static for a plurality of frames; and building part of the scene identified as static.

8 Claims, 1 Drawing Sheet

METHOD FOR REMOVAL OF MOVING OBJECTS FROM A VIDEO STREAM

FIELD OF THE INVENTION

Figure 1:
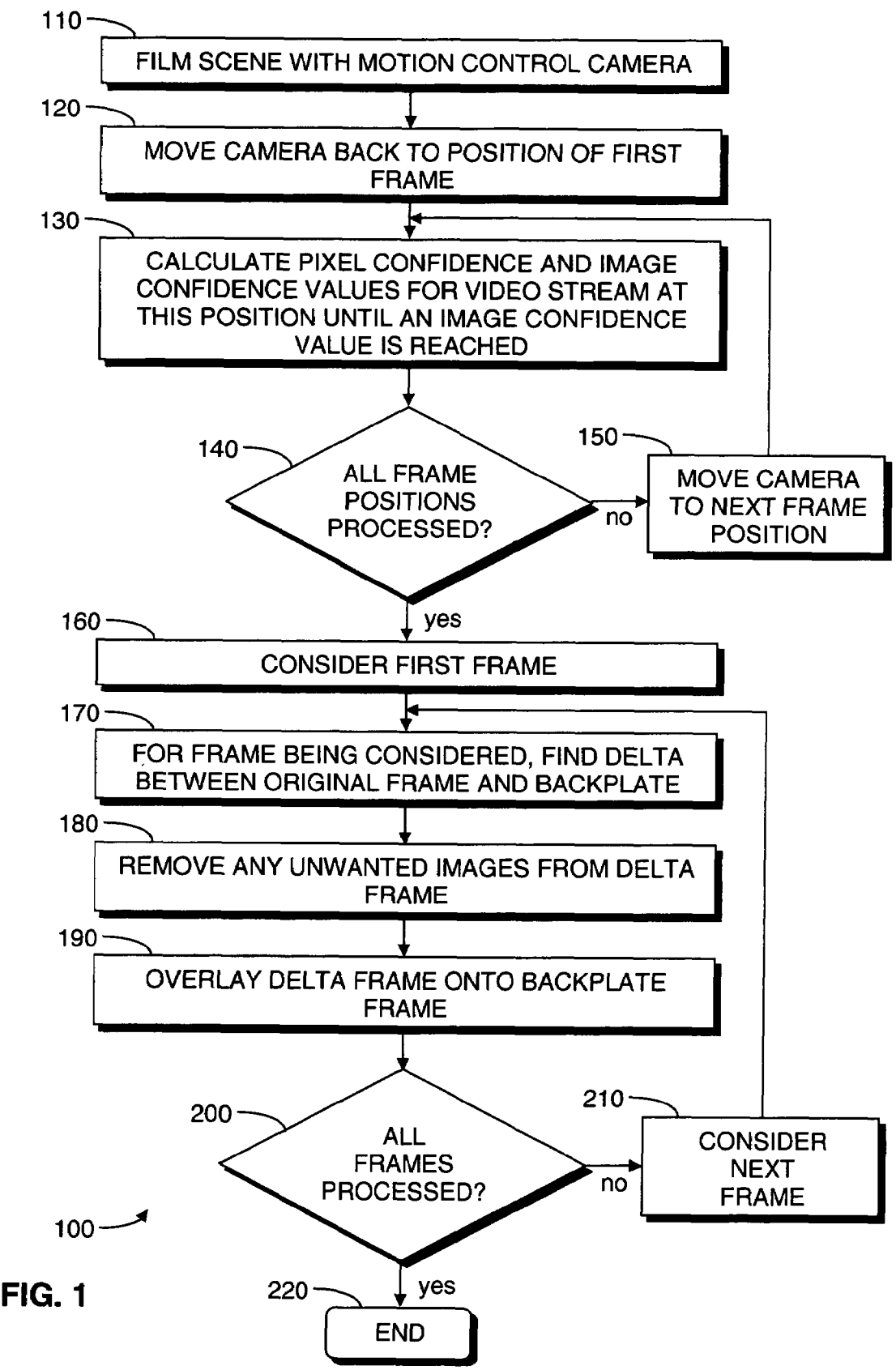

This invention relates to image processing, and particularly to removal of moving objects from a video stream.

BACKGROUND OF THE INVENTION

In the field of this invention it is known that it can be problematic to generate a video image of a scene with all moving objects removed. For example, in filming a motion picture the director may need to film an apocalyptic or relatively deserted view of the streets of a city. In order to do so, the director may "hire" streets of the city for a short period at a relatively affordable time (e.g., a Sunday morning). The streets would be blocked off and emptied and the filming would then take place. Clearly, such an approach is nevertheless extremely costly and disruptive.

There are known software techniques for ameliorating this problem, by digitising existing scanned images of buildings, etc., and pasting these onto three dimensional (3D) computer models, so creating a realistic 3D model. However, building such a 3D computer model is cumbersome.

From patent publication WO/01/1685 there is known a method for real-time segmentation of video objects in known stationary image background. This method uses segmentation of foreground objects calculated by average value of several takes of individual image pixels. Foreground objects are marked, and the method ensures that background is not considered as foreground because of change in light conditions.

From U.S. Pat. No. 6,078,619 there is known an object-oriented video system implemented as a two-layer object model in a video compressor system. In this system bandwidth is reduced by not sending full pictures, there being less information in the background layer.

From U.S. Pat. No. 6,301,382 there is known a method for extracting a matte of a foreground object from a composite image by filming against two completely different backgrounds.

From U.S. Pat. No. 5,915,044 there is known a scheme for encoding video images using foreground/background segmentation. This scheme sends less data for background segments so as to concentrate bandwidth on foreground segments.

From U.S. Pat. No. 5,914,748 there is known a scheme for generating a composite image using the difference of two images. This scheme requires a clean background in order to obtain a fragment object, which is then placed as a foreground object on a new background.

From a demonstration published at the website http://www.cs.huji.ac.il/labs/vision/demos/removal/removal.html it is known to remove a moving object from a video stream of image frames by (i) using optical-flow to identify and track the moving object and to blacken its pixels and (ii) using pixels from subsequent frames to substitute for the blackened pixels. However, this demonstrated technique uses only a single copy of each image, resulting in a low quality end result.

A need therefore exists for method and arrangement for removal of moving objects from a video stream wherein the abovementioned disadvantage(s) may be alleviated.

STATEMENT OF INVENTION

According to a first aspect the present invention provides a method of removing a moving part from a video stream image of a given scene, the method comprising the steps of: obtaining a plurality of frame-series images of the scene, each image comprising a moving part and a static part; comparing the plurality of frame-series images to identify parts of the scene which are static for a plurality of frames; and building a single image of the scene comprising substantially a part of the scene identified as static.

According to a second aspect the present invention provides a computer program element comprising computer program means for performing substantially the method described above.

According to a third aspect the present invention provides an apparatus for removing a moving part from a video stream image of a given scene, the apparatus comprising: means for obtaining a plurality of frame-series images of the scene, each image comprising a moving part and a static part; means for comparing the plurality of frame-series images to identify parts of the scene which are static for a plurality of frames; and means for building a single image of the scene comprising substantially a part of the scene identified as static.

BRIEF DESCRIPTION OF THE DRAWING(S)

One method for removal of moving objects from a video stream incorporating the present invention will now be described, by way of example only, with reference to the accompanying drawing(s), in which:

FIG. 1 shows a flowchart illustrating a method for removal of moving objects from a video stream incorporating the present invention.

DESCRIPTION OF PREFERRED EMBODIMENT(S)

As will be described in greater detail below, this preferred embodiment is based on the conjunction of two techniques:

Firstly, that of histogramming a series of still images in order to derive a confidence value for each pixel in order to remove noise from the images.

Secondly, that of deriving a confidence value for each frame in order to allow a "clean" frame-series to be produced.

Briefly stated, described in greater detail below is a method for removing moving objects from a frame-series video image. The video is filmed several times to provide several copies of each image. For each image the copies are processed to identify static objects and then a new image is built which is made up of pixels taken from the various copies and which were identified as being part of static objects. Accordingly the new image does not include moving objects. Once every image has been processed in this way the video is reconstructed to provide a video sequence without the moving objects. It will be understood that, by obtaining and processing several copies of each image, the method makes it possible to produce a high quality end result.

For each frame in the fixed viewpoint streaming video, every pixel is analysed. Each pixel has a table which stores a history for every colour the pixel has been and how many times it has been that colour, e.g.

| colour (R, G, B) | hits |
|---|---|
| 123, 256, 99 | 10 |
| 123, 256, 102 | 2 |
| 124, 255, 100 | 1 |

A pixel confidence value for a pixel is calculated by:

$$\text{pixel confidence} = \frac{\text{most common colour's hit count}}{\text{total hits for all colours}},$$

i.e., in the above table, pixel confidence=10/13=0.77.

An image is considered "complete" when an overall image confidence value is reached; this is calculated using:

$$\text{image confidence} = \frac{\text{total number of pixels with pixel confidence greater than } X}{\text{total number of pixels}}$$

where X is an adjustable lower bound pixel confidence constant which can be lowered for scenes with greater traffic (since it may be possible that the image confidence value is never reached in "busy" scenes). It will be understood that a minimum image confidence value, that will result in a suitably processed video stream, can be derived from testing an implementation.

Referring now also to FIG. 1, application of the technique to motion control photography may be implemented as follows (to achieve an effect similar to that in such cinematic films as '28 Days Later'™ and 'Vanilla Sky'™:

1 (step 110) Film a scene with a motion control camera (with an actor walking down a street, say)
2 (step 120) Move the camera back to the position of the first frame
3 (step 130) Apply the above technique (calculating pixel confidence and image confidence values as detailed above) to the video stream at this position until an image confidence value is reached
4 (step 140) Repeat previous steps 120 and 130 (moving camera to next frame position—step 150—before each repetition) until all frame positions have been processed.

At this point there have been produced two versions of the same scene: one with the actor and various unwanted moving objects and another which acts as a 'backplate' frame 5 (step 170) For frame being considered (initially the first frame—step 160), find the delta between the original frame and the backplate frame (from step 130 above)
6 (step 180) Remove any unwanted images from the delta frame (e.g., other people walking down the street)
7 (step 190) Overlay the delta frame onto the backplate frame
8 (steps 200 and 210) Until all frames have been processed (step 200), the next frame is considered (step 210) and steps 170, 180 and 190 are repeated.

At this point a finished scene with the desired effect has been produced, and the method ends (step 220).

As mentioned above, it will be appreciated that at the point after step 140 when all frames have been processed, there have been produced 2 video streams or 'movies' exactly aligned frame-by-frame, one with the original with actor & unwanted crowds maybe, and the other the backplate movie with perfect buildings & background and no actor/people whatsoever. A problem arises in the following stage (step 180) stage 7, 'remove the unwanted images'. This is non-trivial, as these frames include the actor himself/herself (who presumably is wanted), so the problem is how to achieve only the desired removal. It will be understood that there are a number of known techniques for achieving this. The actor could be identified in the first frame, by laboriously outlining him/her, and then automatically tracked by computer in each sequential frame (such a technique is known in colorizing black-and-white movies); alternatively, the actor could be filmed on a different set, using 'Ultimatte'™ or chroma-keying techniques, and then compositted onto the backplate movie, which would avoid calculating the deltas at all.

It will be understood that the technique described above in relation to FIG. 1 allows processing to move through the filmed sequence, only moving on once the current frame is processed to an acceptable level. This means that it would not be required to film frames more times than necessary (moving on only when ready), but this does not take into account motion blur that occurs when the scene is filmed with a moving camera. This may be acceptable if the camera is moving slowly during the original sequence, but otherwise the technique described above could be modified replacing steps 130-150 as follows:

(i) re-film sequence from start to finish
(ii) process each frame in the sequence that has not reached the image confidence level
(iii) if the image confidence level has not been reached for all frames then repeat from step (i)

The advantage to this modified method is that it takes into account the effect of motion blur caused by camera movement. Under this modified process, the final full sequence progressively improves until completion is reached. Although a disadvantage of this modified process is that it could involve repeatedly filming individual frames for which the confidence value has already been reached, it would not be necessary to process this redundant footage.

It will be appreciated that the method for removal of moving objects from a video stream described above may be carried out in software running on processors (not shown) in a computer system (also not shown), and that the software may be provided as a computer program element carried on any suitable data carrier (also not shown) such as a magnetic or optical computer disc.

In conclusion, it will be understood that the method for removal of moving objects from a video stream described above provides the following advantages:

does not require construction of a 3D model
results in a high quality video image
once the software has been written it can be used many times over with no additional cost
reduces cost and disruption which would normally be involved in closing off a busy location to film a deserted scene
may allow filming in locations which it may not be possible to close off to film a deserted scene.

Note that a skilled person in the art would realize that the methods described herein and/or with reference to FIG. 1 could be implemented in a variety of programming languages, for example, Java™, C, and C++ (Java is a registered trademark of Sun Microsystems, Inc. in the United States, other countries, or both.). Further a skilled person would realize that once implemented the methods can be stored in a computer program product comprising one or more programs, in source or executable form, on a media, such as floppy disk, CD, and DVD, suitable for loading onto a data processing host and causing the data processing host to carry out the methods. Further a skilled person would realize that the methods described herein and/or with reference to FIG. 1 could be embodied in a data processing apparatus, and further used in providing a compensation service.

What is claimed:

1. A method of removing a moving part from a video stream image of a given scene, the method comprising:
    obtaining a plurality of frame-series images of a scene, each image comprising a moving part and a static part;
    comparing the plurality of frame-series images to identify parts of the scene which are static for a plurality of frames;
    histogramming the frame-series images in order to remove noise therefrom, wherein the histogramming comprises producing for each pixel a pixel confidence value representative of the ratio of a quantity of hits for a most common pixel color for the pixel and a total number of hits for the pixel, where each hit is associated with a histogram entry specific to the pixel and one of the frame-series images; and
    building a single image of the scene comprising substantially a part of the scene identified as static by combining the histogrammed plurality frame series images to build the single image.

2. The method of claim 1 wherein the single image is formed using the most common value for each frame pixel, whereby the resulting image is a representation of the scene with an undesired moving object removed.

3. The method of claim 1 wherein the building comprises producing for each frame an image confidence value representative of the ratio of the total number of pixels in the image with pixel confidence value greater than a predetermined value and the total number of pixels in the image.

4. The method of claim 1 wherein the obtaining comprises obtaining a plurality of frame-series images of the scene captured with a motion control camera.

5. A computer readable medium storing a computer usable program which, when executed, causes a computer to perform processes, comprising:
    obtaining a plurality of frame-series images of a scene, each image comprising a moving part and a static part;
    comparing the plurality of frame-series images to identify parts of the scene which are static for a plurality of frames;
    histogramming the frame-series images in order to remove noise therefrom, wherein the histogramming comprises producing for each pixel a pixel confidence value representative of the ratio of a quantity of hits for a most common pixel color for the pixel and a total number of hits for the pixel, where each hit is associated with a histogram entry specific to the pixel and one of the frame-series images; and
    building a single image of the scene comprising substantially a part of the scene identified as static by combining the histogrammed plurality frame series images to build the single image.

6. The computer readable medium of claim 5, wherein the single image is formed using the most common value for each frame pixel, whereby the resulting image is a representation of the scene with an undesired moving object removed.

7. The computer readable medium of claim 5, wherein the building comprises producing for each frame an image confidence value representative of the ratio of the total number of pixels in the image with pixel confidence value greater than a predetermined value and the total number of pixels in the image.

8. The computer readable medium of claim 5 wherein obtaining the plurality of frame-series images comprises obtaining a plurality of frame-series images of the scene captured with a motion control camera.

* * * * *